April 9, 1968     V. L. RUBY     3,376,765

DETENT WRENCH

Filed May 5, 1966

VICTOR L. RUBY     INVENTOR.

BY

*Louis H. Scholz*
ATTORNEY

United States Patent Office 3,376,765
Patented Apr. 9, 1968

3,376,765
DETENT WRENCH
Victor L. Ruby, Oakland Road,
Sykesville, Md. 21784
Filed May 5, 1966, Ser. No. 550,080
3 Claims. (Cl. 81—121)

ABSTRACT OF THE DISCLOSURE

The device is a modification of a socket type wrench, being substantially a pin or detent finger within the socket, such that, as the socket and castellated nut are advanced on a bolt this detent finger feels for the hole that is usually drilled at right angles to the axis of a bolt and in a bolt for the purpose of fastening a castellated nut with a cotter key or wire. This finger then seats in the hole, and stops the socket wrench and nut action in such a position that some of the castellations are aligned with the hole in the bolt, and are ready for insertion of the wire or cotter key.

---

This invention relates generally to wrenches of the socket type, and more particularly to improvements in the socket per se to provide a sensing device to align a castellated nut with the "cotter key" hole in the bolt to facilitate insertion of the "cotter key" or pin.

In the art of fastening by use of nuts and bolts, some bolts are provided with a hole or holes drilled at appropriate distances from the head of a bolt and these holes are drilled at right angles to the axis of the bolt. They receive a piece of wire, a cotter key or cotter pin, or similar retaining device. When a castellated nut has been assembled on its respective bolt, it is tightened to the proper tension then backed off sufficiently to align one of the castellation grooves with the hole through the bolt, a wire, cotter pin or equivalent (sometimes an ordinary nail) is inserted in the groove of the castellation and through the hole in the bolt then to another groove in the castellation diametrically opposite the first groove and is then bent or otherwise retained in position thus "locking" the nut in a relatively fixed position.

However, when this procedure is carried out in a relatively inaccessible position it is almost impossible to align the castellation grooves with the hole in the bolt.

Other attempts to solve this problem have been made but each has at least one difficulty. Patent No. 1,394,539 of Danielson offers a socket wrench with a hole in the socket to align with the grooves of the castellation, thus allowing the cotter pin to be stuck in the socket hole and "feel" for the alignment with the bolt hole. This suffers the difficulty of possibly losing or dropping the cotter pin, and also requires two handed operation, one for the wrench and one for the cotter pin "feeling" operation.

Another approach is shown in 2,239,548 of J. F. Butler et al. wherein he leaves relatively large windows in spaced relation to each other for visual observation to achieve alignment. This cannot work successfully where there is not a clear visual approach in alignment with the bolt hole (i.e. where the nut is itself in a pocket of equipment or otherwise surrounded by immovable obstructions).

Figure 1:
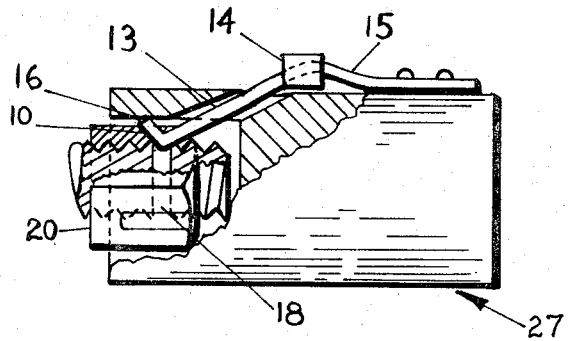
Figure 2:
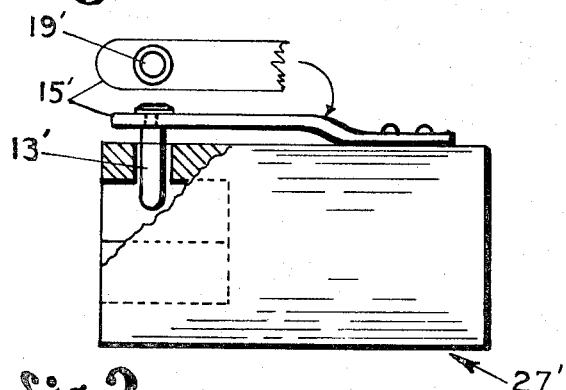
Figure 3:
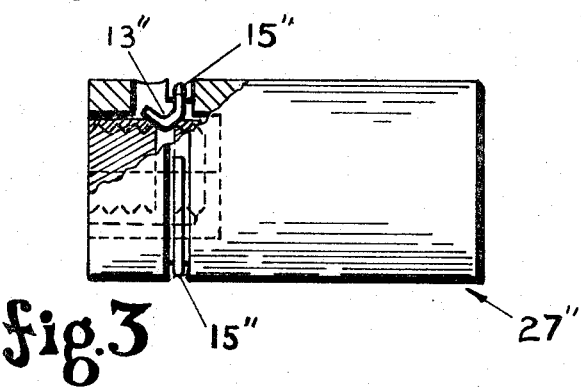

Other objects, advantages and novel details of construction of this invention will be made more apparent as this description proceeds, especially when considered in connection with the accompanying drawing, wherein:

FIGURE 1 is a fragmentary elevation or side view of a socket embodying the invention applied thereto;
FIGURE 2 is a partial sectional elevation view of another embodiment of this invention;
FIGURE 3 is a partial sectional elevation view of a third embodiment of this invention.

Referring now to FIGURE 1, a socket 27 from a socket wrench set is provided with an opening to receive pressure spring finger 13 with slide adjustment ferrule 14 and finger tip 10. In operation spring finger 15 is adjusted by means of slide 14 to an extent necessary to allow bent end 16 to ride over the end of the threaded bolt upon which the nut 20 is to be tightened, and at the tip is also adjusted to just rest in the groove of the castellations. As the socket 27 propels the nut to a tightened position the end point 13 of the finger 15 rides the thread of the bolt 17 until it comes to the hole 18 through the bolt. At the time the finger 15 passes over the hole the natural resiliency of the spring forces it to temporarily engage the hole 18 stopping nut 20 in such a position that if the socket is removed by a straight "away from the bolt" pull then the nut 20 would be left in the proper position for inserting the cotter pin in hole 18.

FIGURE 2 using prime members for similar parts to those of FIGURE 1 shows a modification of the invention shown in FIGURE 1. This modification uses a pin 13' slidably attached in a slot 19' in the end of spring 15' and it operates in the same manner as described for FIGURE 1 above. Alternatively the socket can completely enclose the spring means.

FIGURE 3 using double prime numbers shows a modification of the invention above wherein the spring 15" is in the form of a C shaped spring with a bent end 13" to feel for hole 18" said spring seating in an annular groove around socket 27". The tip of the spring 15" is bent at a slight angle to the axis of the bolt to be engaged so that the spring can ride "up on" the threads of the bolt when the socket and nut are tightened in the usual manner.

From the foregoing description of the invention it is evident that a castellated nut socket wrench has been provided which is light in weight, compact, easy to manufacture, and can be used in cramped locations; and that the wrench offers a maximum of working efficiency by encircling the nut, while permitting uninterrupted operational progressions, until the seat position is found.

It is understood that the use of the invention is not limited to the adjustment of castellated nuts.

Numerous changes can be made in the shape and size of the wrench without departing from the spirit of the invention as set forth in the appended claims.

I claim:
1. A wrench socket for tightening and aligning a castellated nut on a bolt having a cotter pin hole, said socket having a bore of polygonal shape, means on said socket for aligning an opening in a castellated nut with a cotter pin hole in a bolt, said aligning means comprising a resilient attachment to said socket and a finger extending radially into said bore, said finger being narrow and long enough to extend through an opening in a castellated nut and partially into a cotter pin hole in a bolt, whereby when tightening a castellated nut said finger will automatically register partially in said cotter pin hole and prevent further tightening of a castellated nut.
2. A device as in claim 1 wherein said aligning means is attached to an outer surface of said socket and said extending finger extends through an opening in the circumference of said socket to extend through the opening in the castellated nut to engage said cotter pin hole.

3. A device as in claim 1 wherein said aligning means comprises a substantially C shaped piece of metal wire one end of which comprises said aligning means and the other end of which engages the outer surface of the socket.

References Cited

FOREIGN PATENTS

| 1,248,570 | 11/1960 | France. |
| 584,430 | 1/1947 | Great Britain. |
| 402,949 | 3/1943 | Italy. |

MILTON S. MEHR, *Primary Examiner.*

WILLIAM FELDMAN, *Examiner.*